July 14, 1959   N. H. STRODTZ   2,894,882
POLAROGRAPHIC METHOD AND APPARATUS FOR DETERMINING
THE WEIGHT OF OXIDE FILMS
Filed Sept. 19, 1956   3 Sheets-Sheet 1
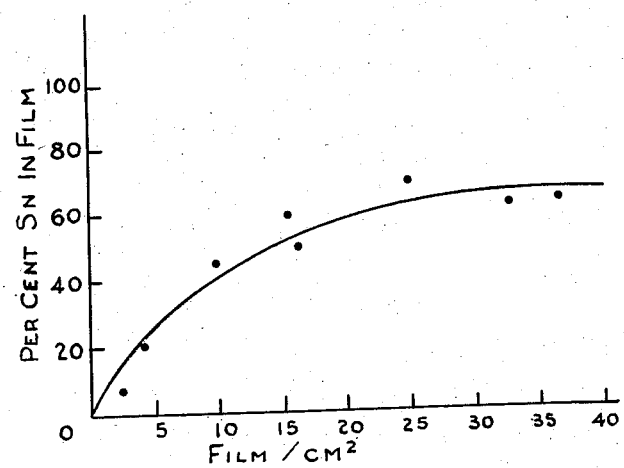
Fig. I.
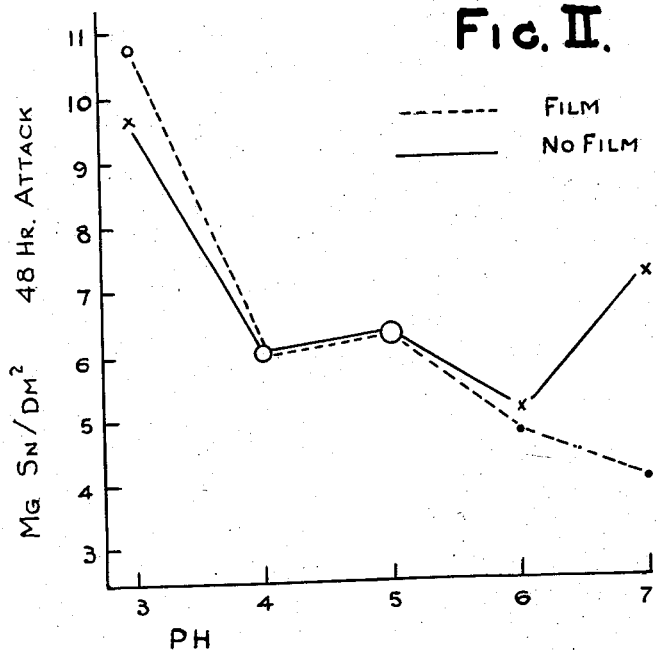
Fig. II.
INVENTOR
NORMAN H. STRODTZ
ATTORNEY

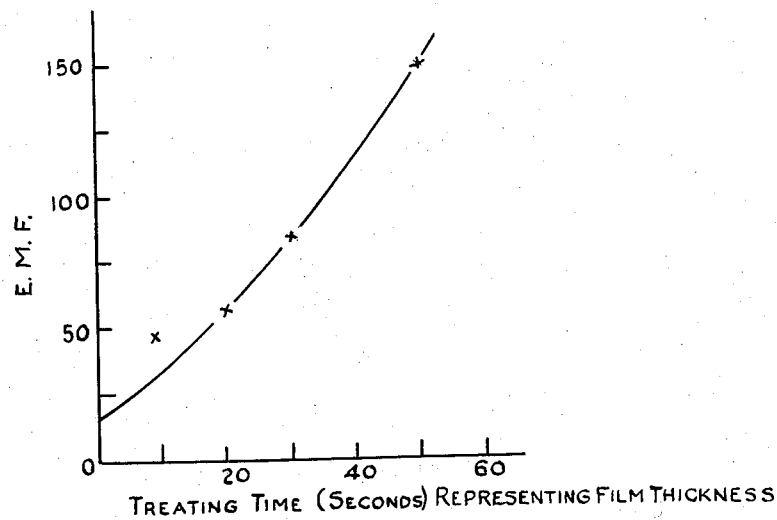
Fig. III.
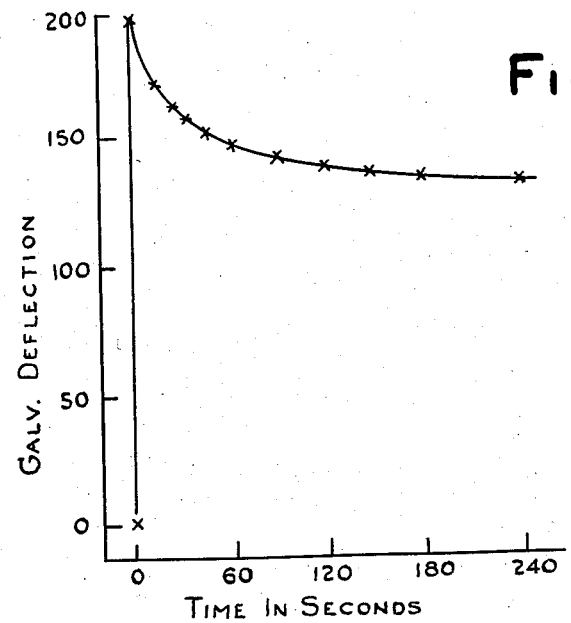
Fig. IV.

Fig. VI.
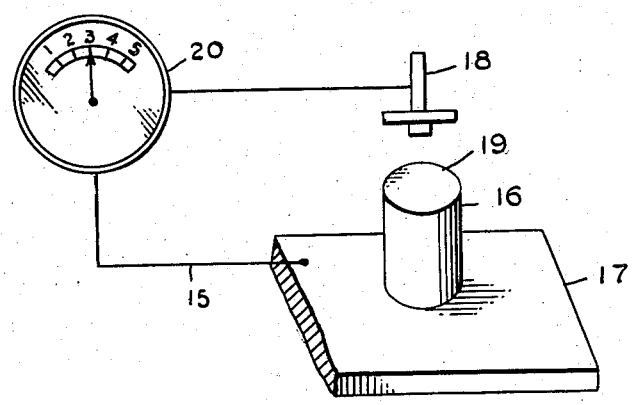
Fig. V.
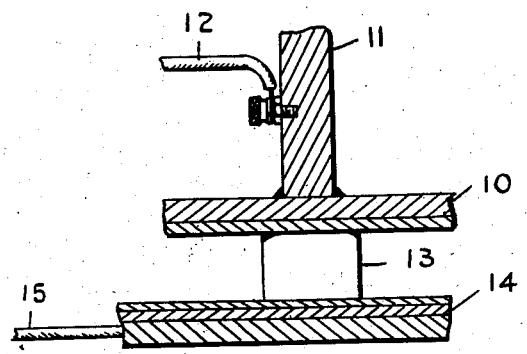
INVENTOR
NORMAN H. STRODTZ

United States Patent Office 2,894,882
Patented July 14, 1959

2,894,882

POLAROGRAPHIC METHOD AND APPARATUS FOR DETERMINING THE WEIGHT OF OXIDE FILMS

Norman H. Strodtz, Western Springs, Ill., assignor to Continental Can Company, Inc., New York, N.Y., a corporation of New York Application September 19, 1956, Serial No. 610,752

5 Claims. (Cl. 204—1)

This invention relates to a method and apparatus for measuring the thickness of the oxide coating on tin plate.

Heretofore there has been no satisfactory method of measuring the thickness of the oxide coating occurring on tin plate. Such coatings are formed on heating or on electrical treatment, such as anodizing.

It is an object of this invention to provide a method and apparatus for accurately determining the thickness of the oxide coating found on tin plate.

It is a further object of this invention to provide an apparatus that will allow the rapid determination of the oxide coating by electrical means.

The various features of novelty which characterize this invention are pointed out with particularity in the claims annexed and forming part of this specification. For a better understanding of the invention, however, its advantages, and specific objects attained by its use, reference should be had to the accompanying drawings and descriptive matter in which is illustrated and described the preferred embodiment of the invention.

Figure 1 is a graph showing the relation between the quantity of tin in the film and the weight of the film per unit area.

Fig. 2 is a graph showing the relation between the weight of tin per unit area and the pH.

Fig. 3 is a graph showing the relation between the electromotive force and the film thickness.

Fig. 4 is a graph showing the relation between the galvanometer deflection and the time in seconds.

Fig. 5 is a detailed showing the detailed construction of the contacting head.

Fig. 6 shows the application of this invention to a can sorting device.

Oxide films on tinplate may have varying compositions, depending on the mechanism of their formation, but usually contain tin oxides and water. Films produced by anodic treatment in sodium hydroxide or acid sodium phosphate solutions have been analyzed, and two analyses for films of different thickness are as follows:

Yellow film:
  Density _____gm./cc__ 3.5
  $SnO_2$ _____percent__ 68.5
  $SnO$ _____do____ 12.4
  $H_2O$ _____do____ 19.1
Brown film:
  Density _____gm./cc__ 5.4
  $SnO_2$ _____percent__ 80.9
  $SnO$ _____do____ 9.3
  $H_2O$ _____do____ 9.8

These data suggest a variation of film composition with film thickness or weight. A curve relating film weight to percent tin in the film, is presented in Figure 1. The changes shown are produced when time of anodic treatment is varied in M/10 sodium carbonate electrolyte at room temperature. Another type of alteration in film composition and properties can be effected by incorporating substances such as chromates or dextrin in the electrolyte, or by treatments which change the film after its formation. An example of the latter is the hydration of the in oxides by exposure to live steam. The film is usually designated by its method of formation.

The present invention is chiefly concerned with unaltered films produced by alkaline anodic treatment, but may be applied to altered films. Oxide films have been formed by many types of treatment. It is obvious that any conditions under which tin surfaces become anodic with respect to a suitable electrolyte may produce surface oxide films. Some conditions under which it is known that films will form are as follows:

(1) Electrolytic anodic treatment.
(2) Hot alkali in the presence of an oxidizing agent.
(3) Differential aeration forming anodic areas.
(4) Heating in an oxidizing atmosphere.

Can making practice involves storage of tinplate and heat application during soldering; these operations sometimes result in easily visible oxide films.

The solubility of the films depends chiefly on the surface available for attack. In genral, a film presenting a hydrated tin oxide surface to a liquid should exhibit the same solubility to that liquid as would the corresponding tin oxide, provided that no other surface reactions occurred. The oxide film is more resistant than the tin surface to attack by sulfide solutions, and by oxidizing agents, provided that the pH remains close to 7. Thus, anodized plate exhibits a definite resistance to sulfide staining. Aerated citrate buffers have varying dissolving properties. At a pH of 6 the film is attacked slowly, and at a pH of 7 the apparent attack is slight. This behavior can be demonstrated to affect the tin surface corrosion as shown in Figure 2. At a pH of 7, the film is insoluble and is confined to pinhole corrosion at points of film discontinuity. The electrical resistance of the film is measured as an index of continuity and thickness. Accordingly, resistance measurements are used, using a modified Wheatstone bridge circuit. Contact with the specimen is made by a pad composed of a glue-glycerine litho roll material to which graphite may be added if desired. This material is formed into a cylindrical disc 75 mm. in diameter and 15 mm. thick. A cathodically cleaned piece of tinplate is used to complete the circuit. Resistance measurements in this manner, showed that the film behaved as an electrolytic rectifier having an extremely high resistance to current flow in one direction, and showing a potential difference between the film and the pad in the opposite direction. This potential is measured by placing plate and pad in series with a 0.1 megohm resistance and a galvanometer.

A series of measurements of anodically treated 1 lb. electrolytic tinplate was used to demonstrate the relationship between film thickness as represented by anodic treating time and E.M.F., as measured by galvanometer deflection. The data obtained is presented in Figure 3. The readings were taken exactly two minutes after the circuit had been completed. A complete curve showing the relationship between galvanometer deflections and time after closing the circuit is shown in Figure 4. This type of E.M.F. measurement is very useful in investigating plate surfaces.

In the application of the above invention, as shown in Figure 5, a reference sheet of tinplate 10 is attached to a plunger 11, in conducting relationship thereto, either by means of welding, brazing, soldering etc. An electrical lead 12 is connected thereto. A pad 13, as described above, is attached to the tinned surfaces of the plate 10, and is brought into contact with the oxide coated tinned surface 14, to be tested. This test plate is connected by means of the lead 15, to an electrical measuring instrument, which as described above is calibrated to read directly in thickness of the oxide coating.

Tinplate may be enameled and when it is, it is usually heated or baked. This thickens the oxide coating on the side not enameled. Such an oxide coating may also be produced by soldering, as noted above. It is sometimes desirable to separate filled cans, some of which have been closed with enameled caps, and some of which have been closed with ordinary tinplate caps. The thicker oxide coating on the enameled caps allows the separation of these cans by using the device as illustrated in Figure 6.

The can 16 is fed on to the table 17, and the plunger 18, constructed as shown in Figure 5, is lowered until the pad strikes the can end 19. The plunger and the table are electrically connected to the indicating instrument 20. These cans having ends not coated with a thicker oxide fail to show any positive indication on the instrument 20. Those cans, the interior surfaces of which are enameled, and which have been heated during the enameling operation, have a thicker oxide coating on the exterior surfaces thereof, and show a positive indication on the instrument 20. This allows the separation of those cans having enameled interior surfaces from those cans without the enameling, without breaking the seal of the can.

In the preferred embodiment of the invention set forth above, a glue-glycerine litho-roll material is used between the reference plate and the oxide plate. Other materials may also be used, which are weak electrolytes, such as a cloth, either cotton or linen saturated with distilled water, or a fibrous material, such as paper dampened with distilled water. Strong electrolytes may also be used, such as a fibrous pad saturated with a 1% potassium chloride solution.

Many circuits using external D.C. or A.C. voltage may be employed, but these would all incorporate the basic invention as set forth above.

While in accordance with the provisions of the statute the best form of embodiment of this invention now known have been illustrated and described, it will be apparent to those skilled in the art that changes may be made in the application of this invention without departing from the spirit thereof, as set forth in the appended claims, and that in some cases certain features may be used to advantage without a corresponding use of other features. Having now described this invention, what is claimed as new and desired to secure by Letters Patent is:

1. A method for sorting tinplate by measuring the thickness of an oxide coating on the surface of tinplate without substantially changing the surface thereof, which comprises contacting the oxide coated surface with a pad composed of a fibrous material saturated with an electrolytic solution, attached to an oxide free reference sheet of tinplate, and measuring the potential difference between the oxide coated tinplate and the reference tinplate.

2. A method for sorting tinplate by measuring the thickness of an oxide coating on the surface of tinplate without substantially changing the surface thereof, which comprises contacting the oxide coated surface with a pad composed of a fibrous material saturated with a potassium chloride solution, attached to an oxide free reference sheet of tinplate, and measuring the potential difference between the oxide coated tinplate and the reference tinplate.

3. A method for sorting tinplate by measuring the thickness of an oxide coating on the surface of tinplate without substantially changing the surface thereof, which comprises contacting the oxide coated surface with a pad composed of glue and glycerine, attached to an oxide free reference sheet of tinplate, and measuring the potential difference between the oxide coated tinplate and the reference tinplate.

4. A method for sorting tinplate by measuring the thickness of an oxide coating on a tinplate sample without substantially changing the surface thereof, which consists in contacting said oxide surface with a pad composed of glue and glycerine containing graphite attached to a reference sheet of tinplate which is oxide free, and measuring the potential difference between the reference sheet and the sample with a potentiometer calibrated in millimeters of oxide thickness.

5. A method for sorting tinplate by measuring the thickness of an oxide coating on a tinplate sample without substantially changing the surface thereof, which consists in contacting said oxide surface with a pad composed of glue and glycerine attached to a reference sheet of tinplate which is oxide free, and measuring the potential difference between the reference sheet and the sample with a potentiometer calibrated in millimeters of oxide thickness.

References Cited in the file of this patent
UNITED STATES PATENTS

| | | |
|---|---|---|
| 2,319,196 | Anderson et al. | May 18, 1943 |
| 2,457,234 | Herbert et al. | Dec. 28, 1948 |
| 2,492,651 | McNamara | Dec. 27, 1949 |
| 2,540,602 | Thomas et al. | Feb. 6, 1951 |
| 2,681,571 | Becker | June 22, 1954 |
| 2,697,673 | Rice | Dec. 21, 1954 |

OTHER REFERENCES

Miley: Carnegie Scholarship Memorial, Iron and Steel, vol. 25, 1936, pages 201–208.

Metallic Corrosion, Passivity and Protection, Evans, Edward Arnold and Co., 1948, page 33.